United States Patent
Papini et al.

(10) Patent No.: US 9,641,033 B2
(45) Date of Patent: May 2, 2017

(54) ELECTRIC MACHINE HAVING OFFSET ROTOR SECTIONS

(71) Applicant: GENERAL ELECTRIC COMPANY, Schenectady, NY (US)

(72) Inventors: Francesco Papini, Munich (DE); Alexander Felix Fiseni, Munich (DE); Mohamed Osama, Garching (DE)

(73) Assignee: General Electric Company, Niskayuna, NY (US)

( * ) Notice: Subject to any disclaimer, the term of this patent is extended or adjusted under 35 U.S.C. 154(b) by 646 days.

(21) Appl. No.: 14/019,630

(22) Filed: Sep. 6, 2013

(65) Prior Publication Data
US 2015/0069863 A1    Mar. 12, 2015

(51) Int. Cl.
  H02K 15/02    (2006.01)
  H02K 1/28    (2006.01)
  H02K 1/27    (2006.01)
  H02K 7/00    (2006.01)

(52) U.S. Cl.
  CPC .............. H02K 1/28 (2013.01); H02K 1/2766 (2013.01); H02K 7/003 (2013.01); H02K 15/02 (2013.01); H02K 2201/06 (2013.01); Y10T 29/49009 (2015.01); Y10T 29/49012 (2015.01)

(58) Field of Classification Search
  CPC ......... H02K 1/28; H02K 1/2766; H02K 7/003
  USPC ........ 310/156.53, 156.09, 216.121, 216.122, 310/216.123
  See application file for complete search history.

(56) References Cited

U.S. PATENT DOCUMENTS

| 4,139,790 A | 2/1979 | Steen | |
| 4,168,459 A * | 9/1979 | Roesel, Jr. .............. | H02J 9/066 310/112 |
| 4,365,180 A * | 12/1982 | Licata ..................... | H02K 1/26 29/598 |
| 4,631,435 A | 12/1986 | McCarty | |

(Continued)

FOREIGN PATENT DOCUMENTS

| CN | 102005883 A | 4/2011 |
| EP | 1689066 A2 | 8/2006 |

(Continued)

OTHER PUBLICATIONS https://www.google.com/search?q=motor+types&tbm=isch
&imgil=FJWZoswO8r2yhM%253A%253BSj_
Gn3voLtDYmM%253Bhttp%25253A%25252F%25252Fwww.
electrical-knowhow.
com%25252F2012%25252F05%25252Fclassification-of-electric-motors.html&source=iu&pf=m
&fir=FJWZoswO8r2yhM%253A%252CSj_
Gn3voLtDYmM%252C_&usg=_
dBAsfmVWEydqlPqE6rSIPZsAg78%3D&biw=1920&bih=1115
&ved=0ahUKEwj.*

(Continued)

*Primary Examiner* — Terrance Kenerly
(74) *Attorney, Agent, or Firm* — Pabitra K. Chakrabarti

(57) ABSTRACT

A motor rotor assembly that includes multiple motor rotor sections and a rotor bar that extends through the motor rotor sections, such that the rotor bar and the motor rotor sections are configured such that the rotor sections are step-skewed, or continuously skewed, from each other. The assembly may be used in an IPM or Synchronous Reluctance motor; and, the motor rotor sections may be of solid core or laminations. Various assembly components, IPM and Synchronous Reluctance motors, and methods of construction/assembly (Continued)

are also disclosed. The present invention has been described in terms of specific embodiment(s), and it is recognized that equivalents, alternatives, and modifications, aside from those expressly stated, are possible and within the scope of the appending claims.

23 Claims, 6 Drawing Sheets

(56) References Cited

U.S. PATENT DOCUMENTS

| | | | |
|---|---|---|---|
| 4,670,696 A * | 6/1987 | Byrne | H02K 19/103 310/168 |
| 5,565,752 A | 10/1996 | Jansen et al. | |
| 5,886,440 A | 3/1999 | Hasebe et al. | |
| 5,886,498 A | 3/1999 | Sul et al. | |
| 5,936,323 A | 8/1999 | Shibukawa et al. | |
| 6,058,596 A | 5/2000 | Jansen et al. | |
| 6,069,467 A | 5/2000 | Jansen | |
| 6,137,258 A | 10/2000 | Jansen | |
| 6,388,353 B1 * | 5/2002 | Liu | F04B 13/00 310/114 |
| 6,388,420 B1 | 5/2002 | Jansen et al. | |
| 6,597,078 B2 * | 7/2003 | Crapo | B62D 5/0403 310/156.01 |
| 6,639,380 B2 | 10/2003 | Sul et al. | |
| 6,707,209 B2 | 3/2004 | Crapo et al. | |
| 6,763,622 B2 | 7/2004 | Schulz et al. | |
| 6,801,011 B2 | 10/2004 | Ide | |
| 6,822,418 B2 | 11/2004 | Harke | |
| 6,847,144 B1 | 1/2005 | Luo | |
| 6,867,524 B2 | 3/2005 | Liang | |
| 6,876,115 B2 | 4/2005 | Takahashi et al. | |
| 6,894,454 B2 | 5/2005 | Patel et al. | |
| 6,924,617 B2 | 8/2005 | Schulz et al. | |
| 6,967,461 B1 | 11/2005 | Markunas et al. | |
| 7,034,423 B2 | 4/2006 | Crapo et al. | |
| 7,045,988 B2 | 5/2006 | Ha et al. | |
| 7,088,077 B2 | 8/2006 | Nagashima et al. | |
| 7,190,130 B2 | 3/2007 | Wogari et al. | |
| 7,245,054 B1 | 7/2007 | Walls et al. | |
| 7,342,338 B2 | 3/2008 | Miyazaki et al. | |
| 7,348,749 B2 | 3/2008 | Ide et al. | |
| 7,541,710 B2 | 6/2009 | Nemoto et al. | |
| 7,679,308 B2 | 3/2010 | Tomigashi | |
| 7,768,220 B2 | 8/2010 | Schulz et al. | |
| 7,902,710 B2 | 3/2011 | Han et al. | |
| 7,902,711 B2 | 3/2011 | Blissenbach et al. | |
| 7,969,058 B2 | 6/2011 | Rahman et al. | |
| 8,018,109 B2 | 9/2011 | Leonardi et al. | |
| 8,035,273 B2 | 10/2011 | Ionel et al. | |
| 8,067,872 B2 | 11/2011 | Pedersen et al. | |
| 8,129,881 B2 | 3/2012 | Hoesle | |
| 8,217,545 B2 | 7/2012 | Kawasaki et al. | |
| 8,228,013 B2 | 7/2012 | Liu et al. | |
| 8,378,534 B2 | 2/2013 | Houle et al. | |
| 8,405,269 B2 | 3/2013 | Spaggiari | |
| 8,436,504 B2 | 5/2013 | Liang et al. | |
| 8,508,094 B2 | 8/2013 | Matt et al. | |
| 9,093,878 B2 | 7/2015 | Huh et al. | |
| 2003/0209950 A1 | 11/2003 | Biais et al. | |
| 2004/0256944 A1 | 12/2004 | Kaneko | |
| 2008/0129243 A1 | 6/2008 | Nashiki | |
| 2009/0026872 A1 * | 1/2009 | Tomohara | H02K 1/148 310/216.011 |
| 2009/0184598 A1 | 7/2009 | Nakano | |
| 2009/0315505 A1 | 12/2009 | Denk et al. | |
| 2010/0127584 A1 * | 5/2010 | Gottfried | H02K 1/2766 310/61 |
| 2010/0156205 A1 * | 6/2010 | Davis | H02K 11/048 310/46 |
| 2010/0301697 A1 * | 12/2010 | Takahashi | H02K 1/2766 310/156.53 |
| 2011/0031843 A1 * | 2/2011 | Liang | H02K 1/2766 310/216.096 |
| 2011/0074231 A1 | 3/2011 | Soderberg | |
| 2011/0080068 A1 | 4/2011 | Dawson et al. | |
| 2011/0304235 A1 | 12/2011 | Hashiba et al. | |
| 2012/0062160 A1 | 3/2012 | Yang et al. | |
| 2012/0235533 A1 | 9/2012 | Tanaka et al. | |
| 2013/0093369 A1 | 4/2013 | Leonardi et al. | |
| 2013/0119810 A1 | 5/2013 | Aoyama | |
| 2013/0154426 A1 | 6/2013 | Melfi et al. | |
| 2014/0117791 A1 | 5/2014 | Fiseni et al. | |
| 2015/0069863 A1 | 3/2015 | Papini et al. | |
| 2015/0084471 A1 | 3/2015 | Huh et al. | |

FOREIGN PATENT DOCUMENTS

| | | |
|---|---|---|
| EP | 1850456 A2 | 10/2007 |
| JP | 62193537 A | 8/1987 |
| JP | 2002238194 A | 8/2002 |
| JP | 2004248443 A | 9/2004 |
| JP | 2011055641 A | 3/2011 |
| RU | 2167481 C1 | 5/2001 |
| RU | 2406209 C2 | 12/2010 |
| RU | 119541 U1 | 8/2012 |
| WO | 8705164 A1 | 8/1987 |
| WO | 2012129799 A1 | 10/2012 |

OTHER PUBLICATIONS

Machine translation of Chen CN102005883.*
S. Han et al., "Design Tradeoffs between Stator Core Loss and Torque Ripple in IPM Machines," IEEE Industry Applications Society Annual Meeting, Oct. 5-9, 2008. pp. 1-8.
PL Search Report issued in connection with corresponding Application No. P410191 on Mar. 4, 2015.
PCT Search Report and Written Opinion issued in connection with corresponding PCT Application No. PCT/US2014/053386 on Jun. 3, 2015.
Ha et al., "Physical Understanding of High Frequency Injection Method to Sensorless Drives of an Induction Machine", Industry Applications Conference, Conference Record of the 2000 IEEE, Rome, vol. No. 3, pp. 1802-1808, 2000.
Jang et al., "Sensorless Drive of Surface-mounted Permanent-magnet Motor by High-Frequency Signal Injection Based on Magnetic Saliency", IEEE Transactions on Industry Applications, vol. No. 39, Issue No. 4, pp. 1031-1039, Jul.-Aug. 2003.
Cupertino et al., "Sensorless Control of Linear Tubular Permanent Magnet Synchronous Motors Using Pulsating Signal Injection", IEEE Industry Applications Society Annual Meeting, IEEE, Edmonton, pp. 1-8, Oct. 5-9, 2008.
Wang et al., "Cogging Torque Reduction in Interior Permanent Magnet Brushless Dc Motor with Flux-Concentration Type Rotor", Electrical Machines and Systems, ICEMS, International Conference Tokyo, IEEE, pp. 1-6, Nov. 15-18, 2009.
Fu et al., "The Design of Interior Permanent Magnet Brushless Motor Control System Based on Finite Element Method", Informatics in Control, Automation and Robotics (CAR), 2nd International Asia Conference, Wuhan, IEEE, vol. No. 3, pp. 130-133, Mar. 6-7, 2010.
Kang, "Sensorless Control of Permanent Magnet Motors", Control Engineering, vol. No. No. 57, Issue No. 4, Apr. 2010.
Yang et al., "Surface Permanent Magnet Synchronous Machine Design for Saliency-Tracking Self-Sensing Position Estimation at Zero and Low Speeds", IEEE Energy Conversion Congress and Exposition (ECCE), pp. 3493-3500, Sep. 12-16, 2010.
Faggion et al., "Ringed-Pole Permanent-Magnet Synchronous Motor for Position Sensorless Drives", IEEE Transactions on Industry Applications, vol. No. 47, Issue No. 4, pp. 1759-1766, May 12, 2011.
Barcaro et al., "Predicted and Experimental Anisotropy of a Dual Three-Phase Interior Permanent Magnet Motor for Sensorless Rotor Position Control", Power Electronics, Machines and Drives (PEMD 2012), 6th IET International Conference, Bristol, pp. 1-6, Mar. 27-29, 2012.

(56) References Cited

OTHER PUBLICATIONS

Wang et al., "A Permanent Magnet Integrated Starter Generator for Electric Vehicle Onboard Range Extender Application", IEEE Transactions on Magnetics, vol. No. 48, Issue No. 4, pp. 1625-1628, Apr. 2012.

Bianchi et al., "Analysis and Experimental Tests of the Sensorless Capability of a Fractional-Slot Inset PM Motor", Sensorless Control for Electrical Drives (SLED), IEEE Symposium,Milwaukee, WI, IEEE, pp. 1-6, Sep. 21-22, 2012.

Marcie, "Comparison of Induction Motor and Line-Start IPM Synchronous Motor Performance in a Variable-Speed Drive", IEEE Transactions on Industry Applications, vol. No. 48, Issue No. 6, pp. 2341-2352, Nov./Dec. 2012.

Faggion et al., "Sensorless Capability of Fractional-Slot Surface-Mounted PM Motors", IEEE Transactions on Industry Applications, vol. No. 49, Issue No. 3, pp. 1325-1332, May/Jun. 2013.

Australian Patent Examination Report issued in connection with related AU Application No. 2014259500 on Jun. 18, 2015.

Canadian Office Action issued in connection with related CA Application No. 2869835 on Jan. 5, 2016.

Unofficial English translation of Kazakhstan Office Action issued in connection with related KZ Application No. 2014/2531.1 on Jan. 7, 2016.

Alexander Felix Fiseni et al., U.S. Appl. No. 14/085,953, filed Nov. 21, 2013.

Francesco Papini et al., U.S. Appl. No. 14/313,380, filed Jun. 24, 2014.

Kum-Kang Huh et al., U.S. Appl. No. 13/666,283, filed Nov. 1, 2012.

Kum Kang Huh et al., U.S. Appl. No. 14/559,037, filed Dec. 3, 2014.

Kum-Kang Huh et al., U.S. Appl. No. 14/974,848, filed Dec. 18, 2015.

W. Fei et al., "Comparison of cogging Torque Reduction in Permanent Magnet Brushless Machines by conventional and Herringbone Skewing Techniques," IEEE Transactions of Energy Conversion, vol. 28, No. 3, Sep. 2013, pp. 664-674.

* cited by examiner

ELECTRIC MACHINE HAVING OFFSET ROTOR SECTIONS

BACKGROUND OF THE INVENTION

The present invention relates generally to electric machines and, more particularly, to electric machines, such as interior permanent magnet machines and Synchronous Reluctance motor machines, that have offset rotor sections.

One general application for electric machines, and interior permanent magnet (IPM) machines in particular, is for use in underground mining vehicles, wherein typically electric wheel motors (e.g., IPM) are connected to the wheels via a gearbox. This application typically requires very high torque at low speeds and yet maintenance of the rated power over a very wide speed range (e.g., on the order of 15:1).

IPM machines unfortunately suffer from both a manufacturing and a technical (i.e., electro-mechanical) shortcoming. With IPM machines, permanent magnets typically are inserted into slots in the rotor structure and pushed entirely through the entire slot depth in order to fill the entire stack length. Due to small clearances between the magnets and the slots in the laminations, and the unevenness of such slots along the entire length, the magnets and/or laminations may be damaged during this insertion process.

Further, depending on their magnitude, torque "ripple", or torque oscillations, of the IPM, may result in damage to the rotor, the gearbox, and/or the mechanical system(s) connected to the IPM (due to fatigue or excessive torque). Additionally, the frequency of the torque ripple might excite resonant modes of the mechanical system(s), further posing an additional threat to the IPM and/or surrounding systems. With regards to torque ripple, similar attributes and shortcomings may also be found, in part, with Synchronous Reluctance motors.

Various attempts at reducing torque ripple have included modifying the stator, via stator skewing with a continuous skewing arrangement. This methodology suffers from an undesirable increase in manufacturing cost and complexity. For example, this can cause an additional complexity with the inserting of coils into the slots. Another countervailing trend in reducing torque ripple is using an odd number of stator slots per pole pair. While this method has proven effective in helping reduce torque ripple, it suffers from the undesirable tradeoff of increasing core losses, which, in turn, may harm efficiency.

Accordingly, there is an ongoing need for improving on current electric machine technologies and/or manufacturing thereof that address at least one of complexity, cost, efficiency, and/or performance without some of the current tradeoffs encountered with current methodologies.

BRIEF DESCRIPTION

The present invention addresses at least some of the aforementioned drawbacks by providing improvements to electric machines, such as an interior permanent magnet (IPM) machines and Synchronous Reluctance motors, such that the electric machines may be both manufactured more efficiently and/or operate with more technical efficiency. More specifically, the present invention is directed to an IPM machine or a Synchronous Reluctance motor that includes offset rotor sections. Further aspects of the present invention include components and assemblies that provide for the offset features of these electric machines. In an embodiment, a vehicle, such as an underground mining vehicle, may employ compact traction motors that utilize aspects of the present invention.

Therefore, in accordance with one aspect of the invention, a component comprises a longitudinal axle, having a plurality of keybars extending outward from a surface of the longitudinal axle, wherein each of the plurality of keybars are disposed axially along and circumferentially around the longitudinal axle, further wherein an axis of the plurality of keybars is parallel to the longitudinal axle.

In accordance with another aspect of the invention, an assembly comprises a plurality of motor rotor sections; and a rotor bar extending through the plurality of motor rotor sections, wherein the rotor bar and the plurality of motor rotor sections are configured to step-skew the plurality of motor rotor sections from each other.

In accordance with another aspect of the invention, a method comprises providing a longitudinal axle shaft; and removing material from the longitudinal shaft to define one of: a plurality of recesses configured to receive a plurality of keybar protrusions; and a plurality of keybar protrusions, wherein the plurality of keybar protrusions are disposed circumferentially around the longitudinal axis.

In accordance with another aspect of the invention, an Interior Permanent Magnet (IPM) machine rotor comprises a plurality of motor rotor sections, wherein the plurality of motor rotor sections are step-skewed.

In accordance with another aspect of the invention, a Synchronous Reluctance motor rotor comprises a plurality of motor rotor sections, wherein the plurality of motor rotor sections are step-skewed.

In accordance with another aspect of the invention, a method of assembly comprises providing a plurality of rotor core sections; and assembling each of the plurality of rotor core sections on a keyed axle shaft, said keyed axle shaft includes at least one key thereon, wherein the at least one key accommodates the plurality of rotor core sections, thereby defining a skewed rotor core stack assembly.

Various other features and advantages of the present invention will be made apparent from the following detailed description and the drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art with respect to the presently disclosed subject matter. The terms "first", "second", and the like, as used herein do not denote any order, quantity, or importance, but rather are used to distinguish one element from another. The terms "a", "an", and "the" do not denote a limitation of quantity, but rather denote the presence of at least one of the referenced item, and the terms "front", "back", "bottom", and/or "top", unless otherwise noted, are used for convenience of description only, and are not limited to any one position or spatial orientation.

If ranges are disclosed, the endpoints of all ranges directed to the same component or property are inclusive and independently combinable (e.g., ranges of "up to about 25 wt. %," is inclusive of the endpoints and all intermediate values of the ranges of "about 5 wt. % to about 25 wt. %," etc.). The modified "about" used in connection with a quantity is inclusive of the stated value and has the meaning dictated by the context (e.g., includes the degree of error associated with measurement of the particular quantity). Accordingly, the value modified by the term "about" is not necessarily limited only to the precise value specified.

Aspects of the present invention provide a motor design methodology that offers several advantages including both an easier manufacturing process that leads to lower production costs, coupled with a reduction in torque ripple. This design, in turn, translates into less stringent requirement in the design of a gearbox connected between the electric motor employing this design with the wheel. Ultimately, this improvement may further lead to cost savings and/or small dimensions with the gearbox.

Torque ripple for purposes herein can be estimated by the following equation:

$$T_{ripple} = (T_{max} - T_{min})/T_{avg}$$

Figure 1:
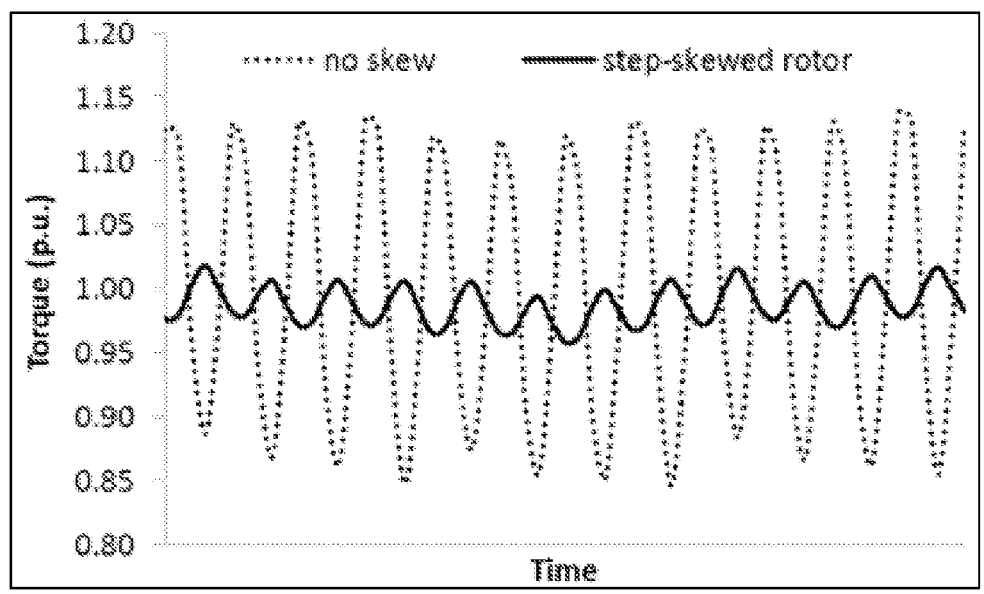
FIG. 1 is a graph illustrating torque over time and the effects in reducing torque ripple in applying aspects of the present invention.

Aspects of the present invention solves both a manufacturing and electro-mechanical problem with IPM machines in that certain embodiments allow for the use of multiple short rotor sections which facilitates the insertion of permanent magnets into the rotor structure, thereby reducing the risk of damage to magnets and/or rotor sections or rotor laminations. Additionally, from an electro-mechanical point of view, certain embodiments angularly shift multiple rotor sections with respect to adjacent rotor sections (e.g., shift by a certain constant angle along the same direction), which causes a large reduction in the amplitude of torque ripple. The reduction in torque ripple results in a concomitant reduction in gearbox size and/or greater safety factor in the motor/gearbox system. FIG. 1 depicts a graph showing torque over time. As shown, the amount of torque ripple is greatly decreased when aspects of the present invention (e.g., step-skewed rotor) are applied to a rotor in an electric machine.

Certain symbols and definitions and concomitant equations are used herein, per the following Table:

| symbol | definition | equation | |
|---|---|---|---|
| $N_{sect}$ | Number of rotor sections | | |
| $\theta_{skew}$ | rotor skew angle between the end sections of the entire rotor stack, for reduction of torque ripple | | |
| $\theta_{sect}$ | skew angle between adjacent rotor sections | $\theta_{sect} = \theta_{skew}/(N_{sect} - 1)$ | Eq. (1) |
| $\theta_{key}$ | constant angle that is required to physically separate the key-bars | $\theta_{key} = \theta_{sect} + \theta_0$ | Eq. (2) |
| $\theta_0$ | additional mechanical offset that allows for the adjacent rotor sections to physically step skew adequately | In one embodiment: $\theta_0 = 360/N_{poles}$ | Eq. (3) |
| $N_{poles}$ | Number of rotor poles | | |

In certain embodiments of the present invention the rotor of the IPM machine is divided into $N_{sect}$ axial sections, wherein each section is offset (or skewed) from its 'neighboring', adjacent section with an angle $\theta_{skew}/(N_{sect}-1)$, wherein "$\theta_{skew}$" is the rotor skew angle between the end sections of the entire rotor stack. In this manner, the IPM machine can feature a lower torque ripple than that obtained in the axially straight rotor version. Such torque ripple mitigation will result in lower fatigue on the mechanical parts, thereby improving life of the machine and the various connected mechanical components. Further, because the need to push the magnets through the entire rotor stack is no longer required, the insertion of pre-magnetized magnets is thereby made easier.

In an embodiment, the rotor assembly may use a number $N_{sect}$ of separate rotor sections to reduce the length along which the magnets must be pushed, thus reducing the risk of damage. These pre-assembled $N_{sect}$ sections are then mounted on a motor shaft, resulting in a skewed rotor assembly. In some particular embodiments, compression may be applied to the assembly after compression plates, or other elements, are applied to either end of the rotor assembly.

Additionally, in an embodiment a small angular rotation between adjacent rotor sections is provided that will also help improve the profile of the electromagnetic torque produced by the motor. In fact, the presence of high order harmonics in both stator and rotor fluxes introduces a series of sinusoidally-varying torque components (with zero average value) superimposed to the constant torque that is required. Shifting the various sections of the rotor all by the same angle and in the same direction, the interaction of stator and rotor fluxes will not be the same along the axial length of machine, yet there will be some phase delay between the various sections. By providing a proper shift angle such phase delay can be used to produce equal and opposite sinusoidal torque components acting on the various sections of the rotor, thus filtering out most of the torque ripple yet with little reduction to the average value of torque.

This skew angle, or small angular rotation, between adjacent rotor sections is found in equation [1]:

$$\theta_{sect} = \theta_{skew}/(N_{sect}-1) \quad [1]$$

The proper value of the shifting between the sections should be carefully evaluated for each machine, depending upon its geometry, winding scheme and supply conditions. In one embodiment of the invention, for example, the rotor is 300 mm long and divided into 5 rotor sections, each 60 mm long and shifted 1.25° (i.e., $\theta_{sect}$) from its neighbors. In this particular embodiment, the peak-to-peak ripple is found to be only 6% the average torque, compared to the value of 30% obtained in a case of straight rotor. Meanwhile, the average torque is reduced by just 1%.

Another characteristic of certain embodiments is that in order to accommodate with the shifted rotor sections, the shaft may include many key-bars along the axial length, to lock the rotor sections to the shaft. Such key-bars may be both axially and angularly displaced. In the angular direction such displacement is equal to the required shift between sections, $\theta_{sect}$, to reduce torque ripple plus a constant angle, $\theta_0$, that may be required to physically separate the key-bars enough so as to accommodate the locking of rotor sections to the shaft. For example, in the above mentioned embodiment, each key-bar is displaced by 61.25°. (e.g., $\theta_{key}$=61.25°; $\theta_{sect}$=1.25°; $\theta_0$=60°). This total angle between adjacent keybars, $\theta_{key}$, is shown in equation [2]:

$$\theta_{key}=\theta_{sect}+\theta_0 \quad [2]$$

$\theta_0$ is an additional mechanical offset that allows for the adjacent rotor sections to more easily physically accommodate the step skewing in relation to each other more easily. In a particular embodiment, $\theta_0$ is related to the quantity of rotor poles $N_{poles}$ in the rotor assembly. In particular embodiments the value $\theta_0$ is found in equation [3]:

$$\theta_0=360/N_{poles} \quad [3]$$

In other embodiments, $\theta_0$ may be virtually any value and wholly unrelated to quantity of poles. In certain embodiments, $\theta_0$ may even have a value of zero (0).

In another embodiment of the present invention, the rotor sections 60 (e.g., solid core or rotor laminations) may feature, on their inner diameter, a series of equally displaced notches to provide proper mating with the key-bars as well as a guide for the section shifting.

Figure 2:
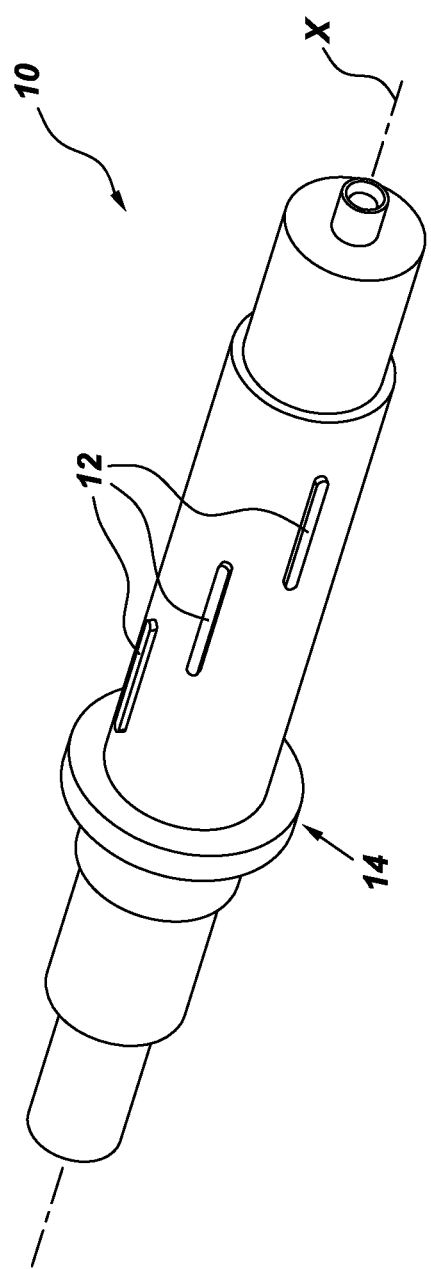
FIG. 2 is a perspective view of a rotor shaft component, according to an embodiment of the present invention.

Referring to FIG. 2, a perspective view of a rotor shaft component, according to an embodiment, is shown. The rotor shaft component, or axle, is shown as 10. As will be discussed herein the axle 10 may be used in coordination with a rotor assembly; a stator; and, thereby in combination be part of an electric machine. The axle 10 may comprise a longitudinal element, or axle, along a longitudinal axis, denoted X. Depending on the embodiment, the axle 10 may further comprise one or more end elements 14 that aid in the use of the axle 10 with the various rotor sections as discussed herein. The length of the axle 10 further comprises a plurality of keybars 12 extending from the body of the axle 10.

The quantity of keybars 12 may vary depending on the configuration of the rotor assembly and/or electric machine that it is used in combination with. The quantity may be any quantity from two to virtually infinite, although it is envisioned that a typical quantity of keybars 12 for many, but not all, embodiments is in the magnitude of between three and ten keybars 12 along the axle 10. The location and configuration of the plurality of keybars 12 is significant in that they aid in providing for the skewing of various rotor sections thereon as discussed herein. The plurality of keybars 12 are configured to match with corresponding plurality of notches on a plurality of rotor sections to provide the step skewing of rotor sections, and, in certain embodiments, continuous skewing of rotor laminations. The plurality of keybars 12 is located so that they are distributed axially along and circumferentially around the shaft of the axle 10. The plurality of keybars 12 are substantially parallel to the longitudinal axis, X. That is the midpoints of plurality of keybars 12 would define a helical, or helicoidal, pattern around and along the axle 10. In an embodiment, a portion of each keybar 12 may overlap, or extend partially, in the axial length with another adjacent keybar 12. Although FIG. 2 shows straight keybars 12, in other embodiments, other shapes and configuration of keybars 12 may be used, including for example helical-shaped keybar(s). (See e.g., FIG. 8).

Various methods for manufacturing the component 10 may be used in various embodiments. For example, the various elements (e.g., 12, 14) of the component 10 may be created by the removal of material from a single, or multiple, ingot elements. In another embodiment, material may be removed along the shaft of the axle 10 so as to define voids, or recesses, configured to receive separate keybar elements, or protrusions, 12 that could be fixedly, or removably, attached to the plurality of voids. In still other embodiments, various elements (e.g., 12, 14, and the like) may be attached via other means and manners.

Figure 6:
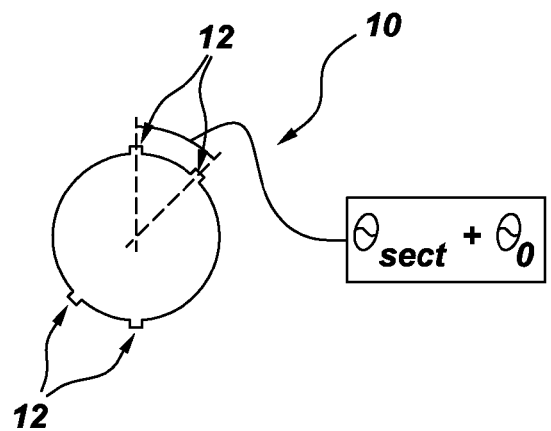
FIG. 6 is an end view of a rotor shaft component, according to an embodiment of the present invention.
Figure 7:
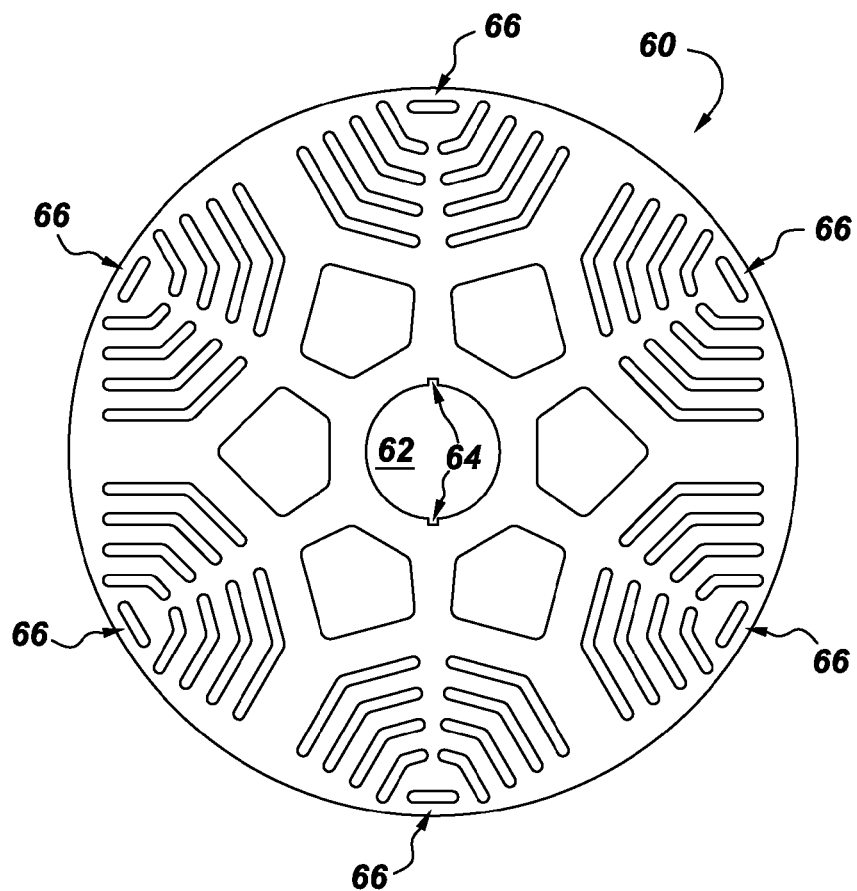
FIG. 7 is a top view of a rotor section, according to an embodiment of the present invention.

Referring to FIG. 6 along with FIG. 2, an end view of an embodiment of a section of the axle 10 is shown. FIG. 6 is showing the key bars 12 configured for two adjacent rotor sections (not shown). The offset angle between the adjacent key bars 12 is depicted as $\theta_{key}$, wherein $\theta_{key}=\theta_{sect}+\theta_0$, wherein $\theta_{key}$ comprises an electrical offset suitable to reduce torque ripple by at least partially cancelling out ripple components in the adjacent rotor sections, and further wherein $\theta_0$ comprises the additional mechanical offset that allows for the physical accommodation of adjacent rotor sections to step skew adequately. As shown, two keybars for two corresponding rotor sections (not shown) are shown at approximately "12 o'clock" and "2 o'clock". In the embodiment shown, the keybars for the other rotor sections of the rotor assembly are omitted for purposes of clarity. In the particular embodiment shown, additional balancing keybars 12 are shown and located 180° from the two key bars 12. Thus, the two balancing keybars 12 are shown at approximately "6 o'clock" and "8 o'clock". The embodiment shown (along with the omitted keybars) would be a suitable axle 10 for use, for example, in a 6-pole IPM or Synchronous Reluctance Machine. The shaft keybars 12 in the axle 10 of FIG. 6 are configured to match corresponding keybar notches 64 shown in the inner opening 62 of the rotor section 60 shown in FIG. 7. By way of example only, the 6 rotor poles of the rotor section 60 of FIG. 7 when used with the axle 10 depicted would results in offsets between adjacent rotor sections 60 of 1.25°.

Figure 4:
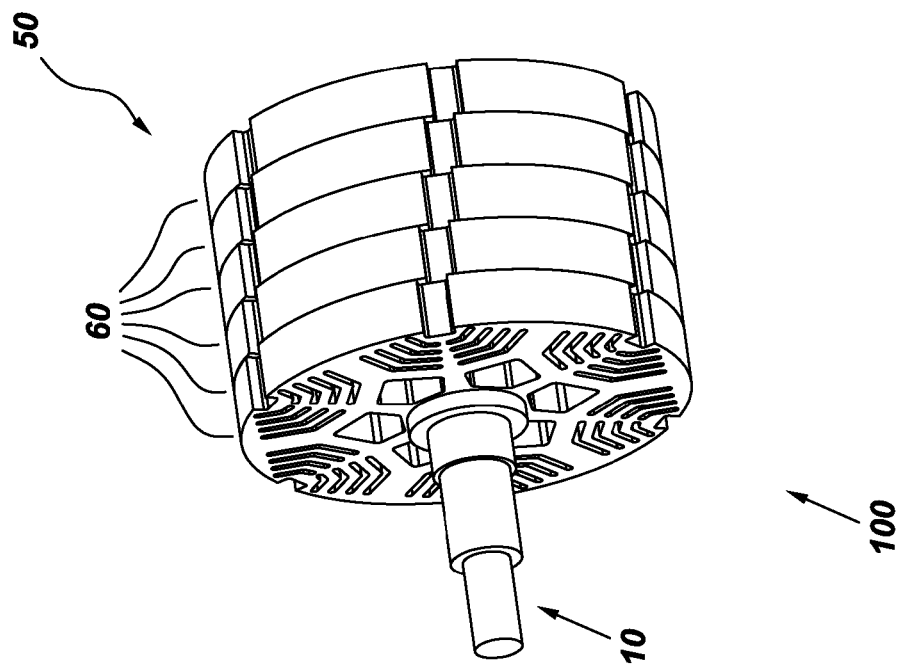
FIG. 4 is a perspective view of the completed assembly of FIG. 3, according to an embodiment of the present invention.
Figure 3:
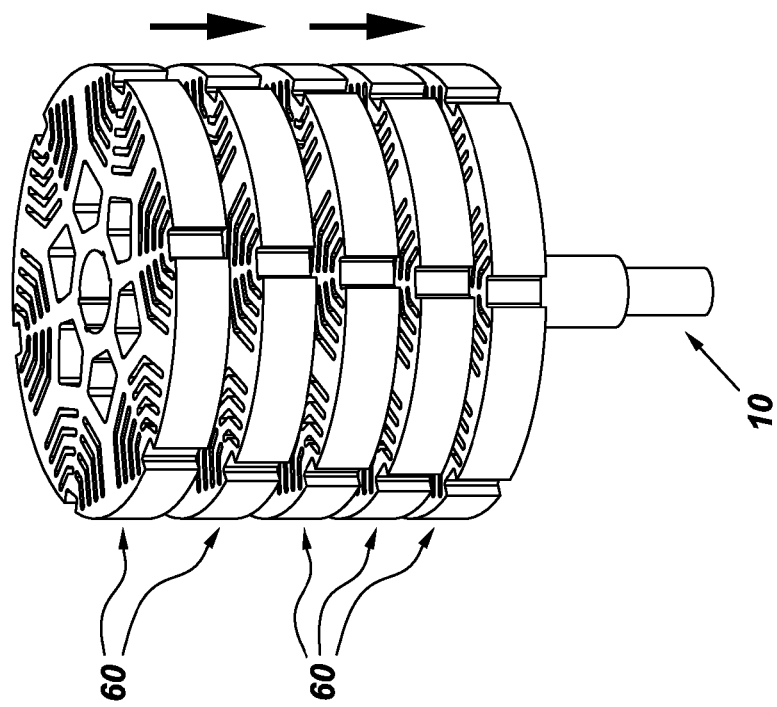
FIG. 3 is a perspective exploded view of the assembling of rotor structure components and the rotor shaft component of FIG. 2, according to an embodiment of the present invention.

Referring to FIGS. 3 and 4, a plurality of rotor sections 60 are shown being assembled along an axle shaft 10 to form a rotor assembly 50 in FIG. 3 and shown completely assembled in FIG. 4. The rotor stack, or assembly, 50 comprises a plurality of pre-manufacture rotor sections 60, assembled together on the shaft 10. In an embodiment, each of the plurality of rotor sections 60 is installed in a step-skewed configuration. Two skewing options include both a 1-slot pitch and half-slot pitch angular displacement between the two ends of the rotor stack 50. The angular rotation between two consecutive rotor sections 60 can be calculated from Equation [1] stated in the Table above.

An analysis has been conducted while delivering rated torque, the condition when the absolute value of the torque ripple is largest and, thus, more harmful to the mechanical components connected to the shaft. The rotor assembly 50 has been assumed being made of five (5) rotor sections 60.

As shown in FIGS. 3 and 4, each rotor section 60 may be premanufactured. The rotor sections 60 are each place in a skewed fashion on the axle 10. As every rotor section 60 has a corresponding keybar 12, the plurality of rotor sections 60 comprise a rotor assembly, or stack 50. Thus, for an electric machine (e.g., IPM or Synchronous Reluctance Machine)

the angular offset between consecutive keybars 12 can be found from equation [2], stated above and found in the Table.

Figure 5A:
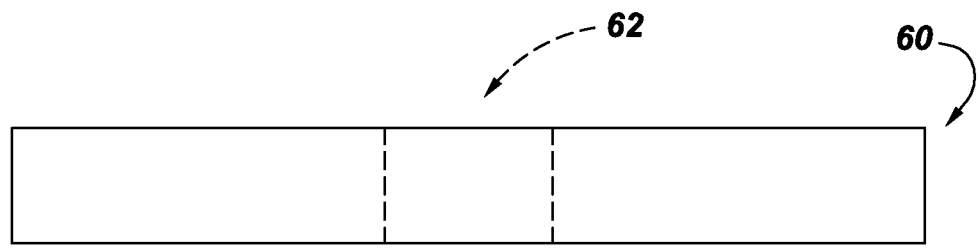
FIG. 5A is a side elevation view of a solid rotor core section, according to an embodiment of the present invention.
Figure 5B:
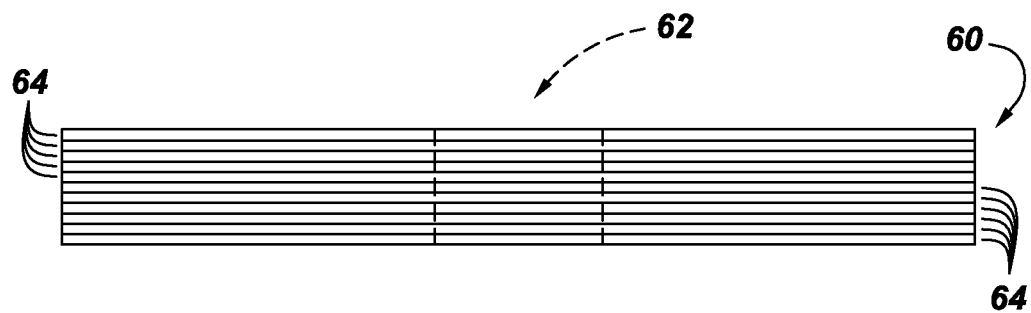
FIG. 5B is a side elevation view of a rotor core section comprised of a plurality of rotor laminations, according to an embodiment of the present invention.

Referring to FIGS. 5A and 5B, two embodiments of a rotor section 60 are shown according to embodiments of the present invention are shown in elevation views. The first embodiment (FIG. 5A) depicts a single rotor section 60 that includes an opening 62 therethrough and further comprises a solid core rotor core section. The second embodiment (FIG. 5B) depicts a single rotor section 60 that similarly includes an opening therethrough, but contrastingly further comprises a plurality of rotor laminations 64. It should be apparent that the quantity of rotor laminations 64 may vary from the embodiment depicted in FIG. 5B. Further, the rotor laminations 64 may be fixedly attached to each other to form the particular separate rotor sections 60. Still further, in other embodiments, the rotor laminations 64 may be freely stacked (e.g., non-fixedly attached) with the particular rotor sections 60.

Figure 8:
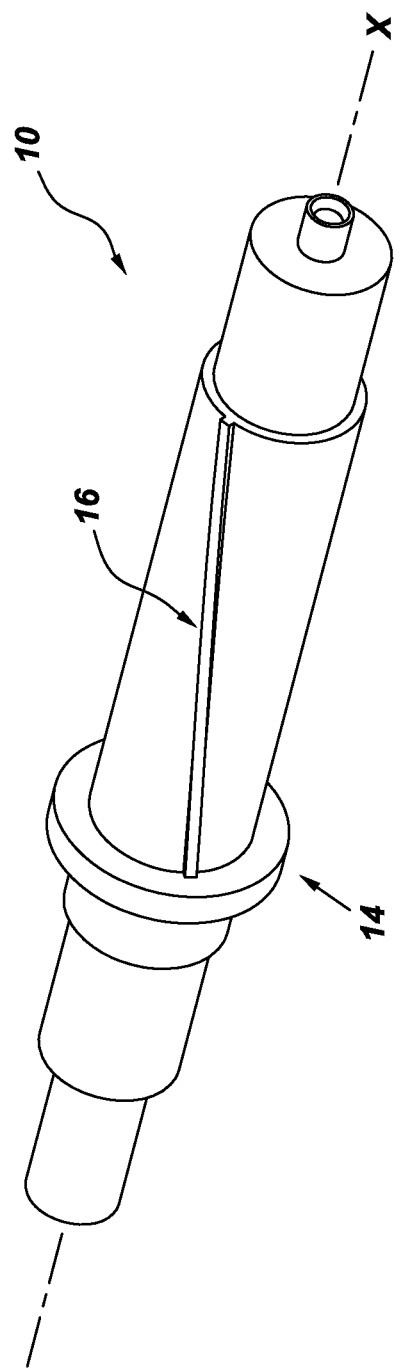
FIG. 8 is a perspective view of a rotor shaft component, according to another embodiment of the present invention.

Referring to FIG. 8, another embodiment of a rotor axle component 10 is shown in perspective view. As depicted, the axle component 10 may include an end element 14 that aids in the keeping of the rotor sections 60 thereon. In the embodiment shown, the axle 10 further comprising a keybar 16 configured in a continuous helical profile, as opposed to the straight keybars 12 shown, for example in FIG. 2. Depending on the embodiment, the helical keybar 16 may be a single keybar configured in a continuous helicoidal pattern partially around the shaft of the axle component 10. In another embodiment, two continuous helical keybars 16 may be located 180° opposite each other on the shaft of the axle component 10. In this manner, the two helical keybars 16 act as balancing keybars to each other.

In an embodiment of the present invention the rotor axle component 10 depicted in FIG. 8 may be used with rotor sections 60 as those depicted in FIG. 5B. That is the plurality of rotor sections 60 each comprised of a plurality of rotor laminations 64 may be placed on the axle component 10 having at least one continuous helical keybar 16. In another embodiment, the rotor axle component 10 depicted in FIG. 8 may be used with rotor sections 60 as those depicted in FIG. 5A. That is the plurality of rotor sections 60 each comprise solid core rotor sections and may be placed on the axle component 10 having at least one continuous helical keybar 16. In this manner, the rotor stack, or assembly, will have a continuously skewed configuration amongst the plurality of rotor sections 60.

A method of assembling a rotor core assembly may include assembling each of the rotor core sections on a keyed axle shaft, as discussed herein. The keyed axle shaft, depending on the embodiment, may have one or more keys thereon. The key(s) accommodate the multiple rotor sections, thereby defining a skewed (continuous or step-skewed) rotor core stack assembly. The rotor core stack assembly may have a compressive force applied to it. In an embodiment, one or more compression plates may be first adjoined to one, or both, end(s) of the rotor core stack assembly, prior to compression. In the IPM embodiment, a plurality of magnets may be inserted through the rotor core sections and affixed to the rotor core sections. In an embodiment, the affixing of magnets may be done by one of: infusing a resin on the rotor core sections; clamp the magnets with a filler or wedge material; and, shrinking the magnets into the rotor core sections. The method is suitable for IPM or Synchronous Reluctance motor (with exception of magnets; step or continuous skewed configurations; and, solid core or plurality of lamination rotor sections.

Under aspects of the present invention, the components 10, 60 and assemblies 50 and the electric machines 100 discussed herein may be used as a traction motor for virtually any vehicle. A vehicle support frame (not shown) may be connected to the one or more electric machine 100. Suitable vehicles for use include, but are not limited to, an off-highway vehicle (OHV), a locomotive, a mining vehicle, electric-motorized railcar, automobiles, trucks, construction vehicles, agricultural vehicles, airport ground service vehicles, fork-lifts, non-tactical military vehicles, tactical military vehicles, golf carts, motorcycles, mopeds, all-terrain vehicles, and the like.

Note that while various embodiments discussed herein describe the improvements to be used in and with IPM, it should be apparent that the various aspects of the present are equally suited for use in and with Synchronous Reluctance machines.

Therefore, in accordance with one aspect of the invention, a component comprises a longitudinal axle, having a plurality of keybars extending outward from a surface of the longitudinal axle, wherein each of the plurality of keybars are disposed axially along and circumferentially around the longitudinal axle, further wherein an axis of the plurality of keybars is parallel to the longitudinal axle.

In accordance with another aspect of the invention, an assembly comprises a plurality of motor rotor sections; and a rotor bar extending through the plurality of motor rotor sections, wherein the rotor bar and the plurality of motor rotor sections are configured to step-skew the plurality of motor rotor sections from each other.

In accordance with another aspect of the invention, a method comprises providing a longitudinal axle shaft; and removing material from the longitudinal shaft to define one of: a plurality of recesses configured to receive a plurality of keybar protrusions; and a plurality of keybar protrusions, wherein the plurality of keybar protrusions are disposed circumferentially around the longitudinal axis.

In accordance with another aspect of the invention, an Interior Permanent Magnet (IPM) machine rotor comprises a plurality of motor rotor sections, wherein the plurality of motor rotor sections are step-skewed.

In accordance with another aspect of the invention, a Synchronous Reluctance motor rotor comprises a plurality of motor rotor sections, wherein the plurality of motor rotor sections are step-skewed.

In accordance with another aspect of the invention, a method of assembly comprises providing a plurality of rotor core sections; and assembling each of the plurality of rotor core sections on a keyed axle shaft, said keyed axle shaft includes at least one key thereon, wherein the at least one key accommodates the plurality of rotor core sections, thereby defining a skewed rotor core stack assembly.

While only certain features of the invention have been illustrated and/or described herein, many modifications and changes will occur to those skilled in the art. Although individual embodiments are discussed, the present invention covers all combination of all of those embodiments. It is understood that the appended claims are intended to cover all such modification and changes as fall within the intent of the invention.

What is claimed is:

1. A rotor shaft component comprising:
a longitudinal axle having a plurality of keybars extending outward from a surface of the longitudinal axle, wherein each of the plurality of keybars are disposed axially along and circumferentially around the longitudinal axle, further wherein an axis of the plurality of keybars is parallel to the longitudinal axle, wherein a portion each of the plurality of keybars overlap an adjacent keybar in a circumferential direction, wherein each of the plurality of keybars are configured to receive a corresponding key on a corresponding rotor section of a plurality of rotor sections, thereby defining a stacked rotor assembly having a step-skewed configuration.

2. The component of claim 1, wherein the plurality of keybars has a helical profile.

3. The component of claim 1, wherein each of the plurality of keybars are straight.

4. The component of claim 1, wherein each of the plurality of rotor sections comprises a plurality of rotor laminations.

5. The component of claim 1, wherein each of the plurality of rotor sections comprises a solid core section.

6. The component of claim 1, wherein the stacked rotor assembly is configured for use in one of an interior permanent magnet (IPM) machine and a Synchronous Reluctance motor.

7. The component of claim 1, wherein the plurality of keybars are disposed circumferentially around the longitudinal axis, wherein a skew angle, $\theta_{sect}$, is an angle between adjacent rotor sections.

8. The component of claim 7, wherein the skew angle, $\theta_{sect}$, is selected to provide a shift in a torque vs. rotor position profile of the plurality of rotor sections, thereby reducing torque ripple.

9. The component of claim 7, wherein an offset $\theta_{key}$ between adjacent keybars comprises $\theta_{sect}+\theta_0$, wherein $\theta_0$ comprises an additional mechanical offset for clearance for adjacent rotor sections.

10. The component of claim 1, wherein the plurality of keybars comprises a first set of keybars, the component further comprising a second set of keybars, wherein each of the keybars of the second set of keybars is located circumferentially opposite a keybar of the first set of keybars.

11. An assembly comprising:
a plurality of motor rotor sections, wherein each of the plurality of motor rotor sections comprise a solid core rotor core section, and wherein each of the plurality of motor rotor section has a key; and
a rotor bar extending through the plurality of motor rotor sections, the rotor bar including a longitudinal axle having a plurality of keybars extending outward from a surface of the longitudinal axle, wherein each of the plurality of keybars are disposed axially along and circumferentially around the longitudinal axle, further wherein an axis of the plurality of keybars is parallel to the longitudinal axle, and wherein a portion each of the plurality of keybars overlap an adjacent keybar in a circumferential direction,
wherein each of the plurality of keybars are configured to receive a corresponding key on a corresponding motor rotor section of the plurality of motor rotor sections, thereby defining a stacked rotor assembly having a step-skewed configuration.

12. The assembly of claim 11, further comprising a plurality of end plates having the plurality of motor rotor sections located therebetween.

13. The assembly of claim 11, further comprising a plurality of magnets located within the motor rotor sections.

14. An interior permanent magnet (IPM) machine comprising the assembly of claim 13, and, a stator surrounding the assembly.

15. The IPM machine of claim 14, wherein the assembly is configured to reduce torque ripple in the IPM machine.

16. The assembly of claim 13, wherein the plurality of magnets comprise a material of at least one of ferrite, alnico, and a rare earth metal.

17. A Synchronous Reluctance motor comprising the assembly of claim 11, and, a stator surrounding the assembly.

18. The Synchronous Reluctance motor of claim 17, wherein the assembly is configured to reduce torque ripple in the Synchronous Reluctance motor.

19. An Interior Permanent Magnet (IPM) machine rotor comprising:
a rotor shaft component including a longitudinal axle having a plurality of keybars extending outward from a surface of the longitudinal axle, wherein each of the plurality of keybars are disposed axially along and circumferentially around the longitudinal axle, further wherein an axis of the plurality of keybars is parallel to the longitudinal axle, wherein a portion each of the plurality of keybars overlap an adjacent keybar in a circumferential direction; and
a plurality of motor rotor sections, each of the plurality of motor rotor section having a key,
wherein each of the plurality of keybars are configured to receive a corresponding key on a corresponding motor rotor section of the plurality of motor rotor sections, thereby defining a stacked rotor assembly of an Interior Permanent Magnet (IPM) machine rotor having a step-skewed configuration, and
wherein the plurality of motor rotor sections are solid core.

20. The IPM machine rotor of claim 19, wherein the plurality of motor rotor sections are laminated.

21. A Synchronous Reluctance motor rotor comprising:
a rotor shaft component including a longitudinal axle having a plurality of keybars extending outward from a surface of the longitudinal axle, wherein each of the plurality of keybars are disposed axially along and circumferentially around the longitudinal axle, further wherein an axis of the plurality of keybars is parallel to the longitudinal axle, wherein a portion each of the plurality of keybars overlap an adjacent keybar in a circumferential direction; and
a plurality of motor rotor sections assembled along the rotor shaft component and defining a rotor stack assembly, each of the plurality of motor rotor section having a key,
wherein each of the plurality of keybars are configured to receive a corresponding key on a corresponding motor rotor section of the plurality of motor rotor sections, thereby defining a stacked rotor assembly of a Synchronous Reluctance motor rotor having a step-skewed configuration with a skew angle, $\theta_{sect}$, defined by the following equation:

$$\theta_{sect}=\theta_{skew}/(N_{sect}-1),$$

where
$\theta_{skew}$ is a rotor skew angle between end sections of the rotor stack assembly; and
$N_{sect}$ is a number of the plurality of motor rotor sections.

22. The Synchronous Reluctance motor rotor of claim 21, wherein the plurality of motor rotor sections are laminated.

23. The Synchronous Reluctance motor rotor of claim 21, wherein the plurality of motor rotor sections are solid core.

* * * * *